Figure 1:
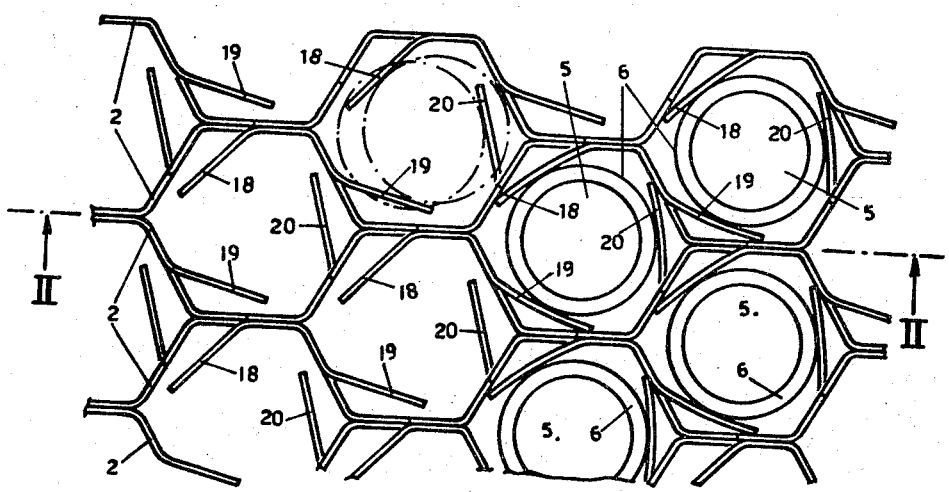

April 18, 1967  J. T. WILMAN  3,314,860
NUCLEAR REACTOR FUEL ELEMENTS WITH SUPPORTING
LATTICES HAVING RESILIENT SPACING MEANS
Filed May 17, 1963

INVENTOR
Johannes T. Wilman
BY
Cushman, Darby & Cushman
ATTORNEYS 3,314,860
NUCLEAR REACTOR FUEL ELEMENTS WITH SUPPORTING LATTICES HAVING RESILIENT SPACING MEANS
Johannes T. Wilman, Rotterdam, Netherlands, assignor to Reactor Centrum Nederland, The Hague, Netherlands, an institute of the Netherlands
Filed May 17, 1963, Ser. No. 281,213
Claims priority, application Netherlands, May 25, 1962, 278,888
4 Claims. (Cl. 176—78)

The invention relates to an improvement of a reactor core as described in patent application No. 239,580 of Nov. 23, 1962, now Patent No. 3,228,854, of which core the fissionable material is provided in the shape of thin vertical rods extending side by side at predetermined distances from one another and being passed through supporting lattices made from strip material, said rods being kept in place by said lattices, said supporting lattices being shaped as networks, the strip material of said lattices surrounding at some distance the rods of fissionable material passed through the meshes thereof and spacer members being provided between said strip material and the rods and keeping the rods centred in the meshes.

In a reactor core for propelling ships it is recommended to let the supporting lattices exert a certain clamping force on the rods of fissionable material. Mechanical damage to the rods is thereby avoided during the movement of the ship, because the rods are not free to bump against the spacer members. Furthermore, the lattices may then, if desired, be exclusively supported by the rods, that in the lattices may be kept detached from the other parts of the reactor core. The latter arrangement can be of importance when bunches of rods are to be mounted or demounted. However, in supporting lattices provided with resiliently clamping spacer members the difficulty is encountered that the spacer members originally define an opening having a smaller diameter than that of the rods of fissionable material, so that during the insertion of the rods into the lattices or during the movement of the lattices over the rods said spacer members scrape the surface of the rods with relatively great force. This makes the mounting of the lattices difficult and may cause damage to said surface. If the rods of fissionable material consist of thin-walled tubes of an alloy of zirconium filled with fissionable material, the damage of the surface of the tubes may cause accelerated corrosion of said tubes.

The improvement according to the invention has for its object to facilitate the mounting of supporting lattices having resiliently clamping spacer members on the rods of fissionable material and to avoid damage of the surface of said rods during the mounting of said lattices. It consists in that in all meshes of such a lattice the resilient spacer members are provided in corresponding places and the spacer members situated in the corresponding one halves, e.g. the left-hand halves of said meshes lie in a certain plane and the spacer members situated in the other, say the right-hand half of each of said meshes lie in another plane which is parallel to the first-mentioned plane. Thus, the spacer members lie, in each mesh, on two levels, so that when the lattice is positioned at a certain angle with a plane at right angles with the rods of fissionable material the spacer members are adapted to enclose without clamping force a cylinder having a somewhat larger diameter than when the lattice is positioned exactly at right angles with the rods. That is why for the manufacture of the reactor core a method is preferred according to which during moving the rods of fissionable material and a supporting lattice to their required relative positions said rods and said lattice are relatively moved in the longitudinal direction of the rods at such an angle with a plane at right angles with said rods that the spacer members of said lattice touch said rods at the most in a slightly resilient way only. After said rods and said lattice have thus been moved through the right relative distance, said rods and said lattice are swung in respect of each other into a position at right angles with one another. For mounting the first lattice the rods of fissionable material may be moved one by one through the meshes of the lattice in an oblique position. However, the following lattices must be moved in an oblique position over the bunch of parallel rods kept at the right distances apart. After all lattices have been brought in place in an oblique position they must be swung in a position at right angles with the rods.

The spacer members are preferably made in such a manner, that when the lattices are moved in an oblique position over the rods, or when the rods are moved in an oblique position through the meshes of a lattice, the spacer members are easily resilient, but if the lattices and the rods are mutually positioned at right angles the spacer members are rigidly resilient. This may be realized by means of spacer members which are formed as straight or substantially straight lips partially stamped out of the strip material of the lattices and extending in planes tangent with the rods of fissionable material, the length of the lips being so chosen as to assure that the lips come to rest with their free end edges against the strip material of the periphery of the meshes, when the rods of fissionable material are passed through the meshes of the lattices at right angles. However, the end edges of the lips are free from the periphery of the meshes before the rods are situated in the lattices and during movement of the rods and the lattices to their required relative positions in mutually oblique positions.

Due to the fact that the spacer members are provided in the lattices on two levels they exert by their clamping force a torque on the rods. If for any reason the lattices are detached from other parts of the reactor core so that they are supported only by the rods, the lattices may be forced by said torques into askew positions in which they become loosened. In order to prevent this a construction is recommended, in which the rods are supported by pairs of interconnected lattices, each of which pairs is the mirror image of the other in respect of the separating plane extending between them, so that their spacer members exert opposite torques on the rods. In that case the lattices of each pair of supporting lattices forming mirror images of one another may be moved at oppositely oblique angles over the bunch of parallel rods kept at the right distances apart, said lattices being thereupon swung against each other into positions at right angles with said rods and finally being connected to one another. This connection may be carried out by spot welding or by means of lips or clips.

Figure 2:
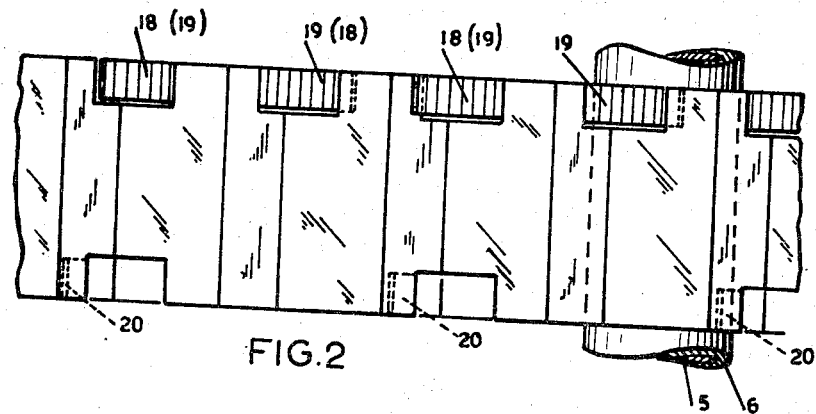
Figure 3:
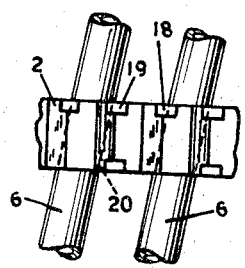
Figure 4:
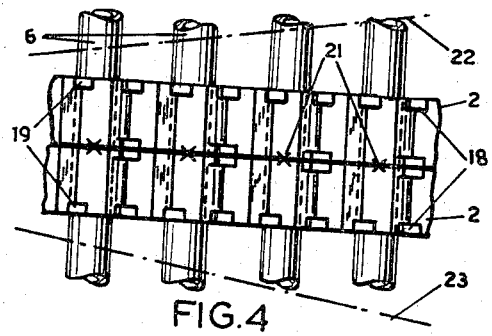

The invention will be further understood with the aid of the accompanying drawing in which :

FIG. 1 is a plan view of a part of a supporting lattice having hexagonal meshes, in each of which a rod of fissionable material is inserted, FIG. 2 a cross sectional view taken on the line II—II in FIG. 1, FIG. 3 is a side view, on a reduced scale showing the oblique movement of fuel rods, one by one, through the sionable material is inserted, FIG. 4 is a side view of a bunch of rods of fissionable material, on which two interconnected supporting lattices are mounted, the lattices being the mirror images of one another.

Referring to FIG. 1a comb-shaped lattice is formed from strips 2 which are bent in a hexagonal meander-shape and are interconnected in offset relation through half the pitch of the meander form. They thus form a net-shaped lattice having hexagonal meshes, through which the rods of fissionable material consisting of thin-walled tubes 6 filled with fissionable material 5 are passed. Within the meshes of the lattices the rods of fissionable material 5, 6 extend freely from the strip material of the lattices and they are kept centered by spacer members having the shape of straight or substantially straight lips 18, 19, 20 partially stamped out of the strip material of the lattices and extending in planes tangent with the rods of fissionable material. The lips 18, 19 situated in the left-hand halves of the meshes are stamped out of the upper marginal portions of the strips 2, and the lips 20 situated in the right-hand halves of the meshes are stamped out of the lower marginal portions of the strips 2. The lips 18 and 19 thus lie on a higher level than the lips 20.

If the rods of fissionable material are not present in the meshes, the lips 18, 19, 20 spring freely inwards and they are easily resilient. However, if the rods are situated in the meshes the lips are pressed with their free end edges against the strips 2 of the periphery of the meshes so that the lips are supported at both ends and are adapted to exert a great clamping force on the rods 5, 6.

In the oblique position shown in FIG. 3, in which the rods 5, 6 are moved through the meshes of the lattice 2, the free area between the upper lips 18, 19 and the lower lips 20 is larger than the free area offered when the rods and the lattice are at right angles with one another. If care is taken to assure that in the said oblique position the free area between those lips is larger than or substantially equal to the cross sectional area of the rods of fissionable material, the lips will not or will only slightly resiliently touch the rods during their insertion into the lattice, and the surface of said rods will not be damaged by the lips. After the rods have been moved in the oblique position sufficiently far through the lattice, they are swung into a position at right angles with the lattice and the lips are pressed with their free end edges against the strips 2 of the periphery of the meshes, whereby they become considerably more rigid and whereby they become adapted to keep the rods in place with great clamping force. The same effect is obtained if the rods are held at certain distances apart, say by a holder, and a lattice is first moved in an oblique position over the bunch of rods, after which the holder is removed and the lattice is swung into a position at right angles.

In FIG. 4 two lattices which are mirror images of one another are mounted one against the other on the rods, and said lattices are connected to one another by spot welding at 21. Since the lattices are mirror images of each other, they are moved over the bunch of rods at opposite angles indicated by the dotted lines 22 and 23, and thereafter they are swung towards each other into positions at right angles with the rods. The torques exerted on the rods by the lips 18, 19, 20 of the upper lattice oppose those exerted on the rods by the lips 18, 19, 20 of the lower lattice, so that the assembly of the two interconnecting lattices has no tendency to be forced into an askew position by said torques, which would be the case with a single lattice which is not attached to other parts of the reactor core.

What is claimed is:

1. A fuel element assembly for a nuclear reactor, the assembly comprising: a plurality of vertical rods containing fissionable material, each rod having a round cross sectional area; at least one horizontal supporting lattice made of strip material and having equal meshes, each rod being located in an individual mesh of said lattice, the inscribed circle of each mesh having a greater diameter than that of the rods; and resilient spacing members forming part of the lattice and projecting into the meshes thereof, said spacing members resiliently contacting said rods and holding them both centralized in said meshes and spaced apart from one another, all meshes being provided with equally arranged sets of equal numbers of spacing members, those spacing members which are located in the same horizontal one halves of the meshes being disposed nearer the upper surface of the lattice than to the lower surface of the lattice, and those spacing members located in the other halves of the meshes being disposed nearer to the lower surface of the lattices than to the upper surface of the lattice.

2. A fuel element assembly as claimed in claim 1, in which the spacing members are substantially straight resilient lips partially stamped out of the strip material of the lattice and projecting in oblique directions into the meshes generally tangential to the rods with their free ends free from the strip material surrounding the meshes when the lattice does not contain rods, said lips being contacted intermediate their ends and forced with their free ends against the strip material surrounding the meshes by the rods located in the latter.

3. A fuel element assembly as claimed in claim 1, said lattices being comprising at least two coaxial lattices, said lattices being axial mirror images of one another and being attached to one another.

4. A fuel element assembly for a nuclear reactor comprising: a plurality of vertical cylindrical fuel rods containing fissionable material; a horizontally extending supporting lattice constructed of strip material and having equal meshes, each rod being located in an individual mesh of said lattice, the inscribed circle of each mesh having a greater diameter than that of said rods; and spacer means associated with each of said meshes for allowing relative movement between said rods and said lattice in a direction along the axes of said rods when said lattice is at an angle to a plane extending transversely to said rods and for exerting substantial clamping force on the sides of said rod when said lattice is at a right angle to said rods to thereby center and hold said rods in said meshes, said spacer means including a first spacer member projecting into each mesh and yieldable in the plane of the lattice, all of said first spacer members being disposed in a single plane and projecting from the same side of their respective meshes when viewed from above, said spacer means further including a second spacer member projecting into each mesh and yieldable in the plane of the lattice, all of said second spacer members being disposed in a single plane below said first members and projecting from generally the opposite side of their respective meshes whereby rods of diameter sufficient to be tightly engaged by said first and second spacer means when said rods and lattice are at a right angle to each other are easily movable in a longitudinal direction relative to said lattice when said rods and lattice are cocked with respect to each other.

References Cited by the Examiner

FOREIGN PATENTS 1,285,670  1/1962  France.
897,232    5/1962  Great Britain.

OTHER REFERENCES

Knodler et al.: German application 1,085,976, printed July 28, 1960.
Kropfl: German application 1,082,679, printed June 2, 1960.

L. DEWAYNE RUTLEDGE, *Primary Examiner.*

REUBEN EPSTEIN, *Examiner.*

R. L. GRUDZIECKI, *Assistant Examiner.*